(12) United States Patent
DelNero et al.

(10) Patent No.: US 7,734,386 B2
(45) Date of Patent: Jun. 8, 2010

(54) SYSTEM FOR INTELLIGENTLY CONTROLLING A TEAM OF VEHICLES

(75) Inventors: Dale E. DelNero, Endicott, NY (US); Stephen J. DeMarco, Binghamton, NY (US); Adam Jung, Owego, NY (US); John O. Moody, Vestal, NY (US); Peter N. Stiles, Owego, NY (US); Robert J. Szczerba, Endicott, NY (US); Joel J. Tleon, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1259 days.

(21) Appl. No.: 11/188,685

(22) Filed: Jul. 25, 2005

(65) Prior Publication Data

US 2007/0021879 A1    Jan. 25, 2007

(51) Int. Cl.
*G01C 23/00* (2006.01)
(52) U.S. Cl. .................... 701/23; 701/120; 340/961; 434/11; 244/3.15; 244/152
(58) Field of Classification Search ................. 701/23, 701/120; 434/11; 340/961; 244/3.1, 3.15, 244/152; *G01C 23/00*
See application file for complete search history.

(56) References Cited

U.S. PATENT DOCUMENTS

| | | | |
|---|---|---|---|
| 5,208,750 A | 5/1993 | Kurami et al. | |
| 5,508,928 A * | 4/1996 | Tran | 342/13 |
| 5,608,627 A * | 3/1997 | Lecomte et al. | 701/3 |
| 6,122,572 A * | 9/2000 | Yavnai | 701/23 |
| 6,175,783 B1 | 1/2001 | Strength et al. | |
| 6,480,769 B1 | 11/2002 | Kageyama | |
| 6,498,968 B1 | 12/2002 | Bush | |
| 6,505,100 B1 | 1/2003 | Stuempfle et al. | |
| 6,654,669 B2 | 11/2003 | Eisenmann et al. | |
| 6,665,594 B1 | 12/2003 | Armstrong | |
| 6,675,081 B2 | 1/2004 | Shuman et al. | |
| 6,772,055 B2 | 8/2004 | Hagelin | |
| 6,832,156 B2 | 12/2004 | Farmer | |
| 6,873,886 B1 | 3/2005 | Mullen et al. | |

(Continued)

OTHER PUBLICATIONS

"4D/RCS a Reference Model Architecture for Intelligent Unmanned Ground Vehicles", author(s): James S. Albus.

(Continued)

*Primary Examiner*—Tuan C To
(74) *Attorney, Agent, or Firm*—Tarolli, Sundheim, Covell & Tummino LLP

(57) ABSTRACT

A system collaboratively and autonomously plans and controls a team of vehicles having subsystems within an environment. The system includes a mission management component, a communication component, a payload controller component, and an automatic target recognition component. The mission management component plans and executes a mission plan of the team and plans and executes tasks of the vehicles. The communication component plans communication and networking for the team. The communication component manages quality of service for the team. The communication component directs communication subsystems for the team and for the vehicles. The payload controller component directs and executes sensor subsystems for the team and for the vehicles. The automatic target recognition component processes and fuses information from the sensor subsystems and from the vehicles for use by the mission management component.

10 Claims, 11 Drawing Sheets

U.S. PATENT DOCUMENTS

| | | | |
|---|---|---|---|
| 6,875,019 | B2 | 4/2005 | Huang et al. |
| 2002/0003191 | A1* | 1/2002 | Schwaerzler ................ 244/152 |
| 2002/0161489 | A1 | 10/2002 | Johnson |
| 2003/0152892 | A1* | 8/2003 | Huang et al. .................. 434/11 |
| 2003/0164794 | A1 | 9/2003 | Haynes et al. |
| 2004/0068351 | A1* | 4/2004 | Solomon .................... 701/24 |
| 2004/0068415 | A1 | 4/2004 | Solomon |
| 2004/0073341 | A1* | 4/2004 | Moitra et al. ................ 701/10 |
| 2004/0158355 | A1 | 8/2004 | Holmqvist et al. |
| 2004/0174822 | A1 | 9/2004 | Bui |
| 2005/0004723 | A1 | 1/2005 | Duggan et al. |
| 2005/0015201 | A1 | 1/2005 | Fields et al. |
| 2006/0121418 | A1* | 6/2006 | DeMarco et al. .............. 434/11 |

OTHER PUBLICATIONS

"Intelligent Control of Unmanned air vehicle: Program Summary and Representative Result", author(s): D. G. Ward, M. Sharma, N.D. and D. Richards.

"FCS Unmanned Ground Vehicles", source(s): http://www/globalsecurity.org/military/systems/ground/fcs-ugv.htm.

* cited by examiner

SYSTEM FOR INTELLIGENTLY CONTROLLING A TEAM OF VEHICLES

FIELD OF INVENTION

The present invention relates to a system for controlling vehicles, and more specifically, to a system for intelligently controlling a team of vehicles.

BACKGROUND OF THE INVENTION

Conventionally, remote stations control unmanned vehicles. These unmanned vehicles may be self-controlling, or autonomous. Conventional unmanned systems may extend the vision and the reach of a Warfighter. However, the Warfighter may spend so much time managing these assets that the Warfighter may lose effectiveness as a Warfighter.

Autonomy can relieve a Warfighter of this burden. By limiting the required role of a Warfighter from command and control to command only, an unmanned system may move from force extension to force expansion. Collaboration may further move an unmanned system from force expansion to force multiplication. This may allow a Warfighter to perform his duties more effectively, more successfully, and more decisively.

However, an autonomous system may face increasing challenges in control techniques. An autonomous system must be aware of the environment and adapt plans based on changes in understanding of the environment. Control, therefore, ideally is flexible, both in development and in execution.

An autonomous system is given objectives to be achieved. These objectives may be as simple as monitor state and report problems, or complex, for example, assault and capture a target area. Also, a system may be given constraints, such as flight corridors, acceptable risks, or authorized targets. A challenge may then be to integrate these objectives and constraints with environmental state and system state to plan and execute a mission plan in order to achieve the input objectives without violating the constraints.

Furthermore, an autonomous system may itself consist of autonomous systems. Thus, the autonomy may also coordinate multiple autonomous systems to act in concert. The team of unmanned vehicles may have access to assets external to the autonomous team that would aid in performance of the mission. These assets should also be used in concert with the autonomous team.

Conventional systems focus on individual autonomy, ignoring an important facet of collaborative autonomy. Conventional systems are also monolithic insofar as a single control system performs all functions required. Conventional systems thus fail to recognize different disciplines needed to perform the various functions. For example, the conventional system requires awareness of its environment. This requires inferences and estimations of probabilities in a data rich environment. This is different from planning, which takes the estimate of the environment and attempts to optimize courses of actions that effect change to the environment.

SUMMARY OF THE INVENTION

An example system in accordance with the present invention collaboratively and autonomously plans and controls a team of vehicles having subsystems within an environment. The system includes a mission management component, a communication component, a payload controller component, and an automatic target recognition component. The mission management component plans and executes a mission plan of the team and plans and executes tasks of the vehicles. The communication component plans communication and networking for the team. The communication component manages quality of service for the team. The communication component directs communication subsystems for the team and for the vehicles. The payload controller component directs and executes sensor subsystems for the team and for the vehicles. The automatic target recognition component processes and fuses information from the sensor subsystems for use by the mission management component.

An example computer program product in accordance with the present invention collaboratively and autonomously plans and controls a team of vehicles having subsystems within an environment. The computer program product includes: a first instruction for planning and executing a mission plan of the team; a second instruction for planning and executing tasks of the vehicles; a third instruction for planning communication and networking for the team; a fourth instruction for managing quality of service for the team; a fifth instruction for directing communication subsystems for the team and for the vehicles; a sixth instruction for directing and executing sensor subsystems for the team and for the vehicles; and a seventh instruction for processing and fusing information from the sensor subsystems and from the vehicles.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

For a team of unmanned autonomous vehicles to execute a mission plan, it is important to weave collaborative aspects into the mission plan sooner rather than later, because many disciplines change in a collaborative environment. For example, planning for a team of autonomous assets should consider heterogeneous (e.g., manned, unmanned, manned and unmanned, etc.) and dynamic asset attributes that may make autonomous decisions based on previously unknown information impacting the team's mission plan. Team planning should recognize and process this impact.

A system in accordance with the present invention may provide an architecture for autonomously planning and controlling collaborating teams of unmanned vehicles. The system may integrate collaboration of teammates and external assets by incorporating elements of collaboration in various components and dedicating a component to this collaboration. The system may also integrate different disciplines for successful development and execution of a mission plan. These elements have been absent or underrepresented in conventional systems.

The system may consist of nine components including one dedicated solely to collaborative functionality. Thus, the system may be scalable in that as it is instantiated on multiple systems, a collaborative team may grow without placing undue burden on a central control point (i.e., each system represents a teammate rather than a subordinate, etc.). While one component is dedicated to collaboration, the other components execute individual vehicle autonomy. Together, the components enable the system to form a scalable team of collaboratively autonomous vehicles.

Vehicle specific components may include an Automatic Target Recognition component, a Payload Controller component, and a Communication component. These components may require more than the core collaborative autonomy and functionality.

Figure 1:
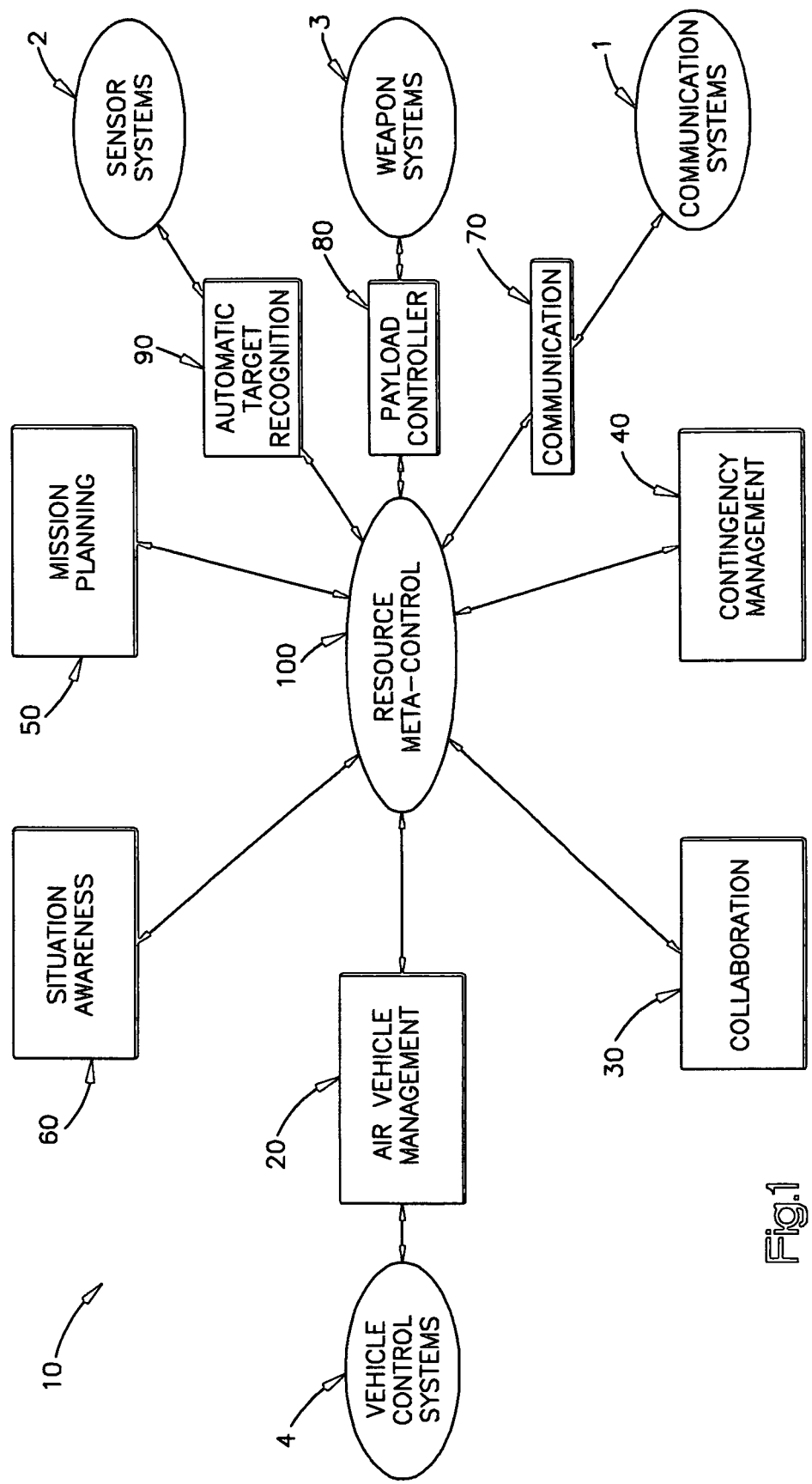
FIG. 1 is an example schematic representation of a system in accordance with the present invention.

An example system 10 (FIG. 1) in accordance with the present invention may recognize differences in disciplines and segment them into nine major components: an Air Vehicle Management (AVM) component 20, an Automatic Target Recognition (ATR) component 90, a Collaboration component 30, a Communication component 70, a Contingency Management (CM) component 40, a Mission Planning (MP) component 50, Payload Controller (PC) component 80, a Resource Meta-controller (RMC) component 100, and a Situational Awareness (SA) component 60. These components 20, 30, 40, 50, 60, 70, 80, 90, 100 work in concert to achieve objectives without violating input constraints. Together, the Air Vehicle Management (AVM) component 20, the Collaboration component 30, the Contingency Management (CM) component 40, the Mission Planning (MP) component 50, the Situational Awareness (SA) component 60, and the Resource Meta-Controller (RMC) component 100 may comprise a mission management component.

The Mission Planning component 50 may be onboard the autonomous system 10. The Mission Planning component 50 may perform pre-mission and dynamic in-mission replanning for the collaborative team. The Mission Planning component 50 may develop collaborative synchronized plans for sensor employment, flight paths, communications, and engagements.

Overall mission plans may be defined in a hierarchical fashion with mission plans at a highest level—such as Teams A and B recon area ZEBRA, team plans at a next level, and individual vehicle plans at a lowest level. These hierarchical plans may optimize and/or consider factors such as high level mission objectives and constraints, resource allocation for vehicles, payload configuration for different mission objectives, and collaborative use of onboard sensors and external Intelligence, Surveillance, and Reconnaissance (ISR) assets to detect, identify, and geo-locate vehicle and dismounted infantry targets of interest. These hierarchical plans may optimize and/or consider factors such as communication events that support the teams' information dissemination and synchronization requirements, routes supporting a planned use of sensors and communication while minimizing threat exposure, and target engagement planning and weapon deployment sequencing.

The Mission Planning component 50 may accept objectives and constraints for planning missions, as well as alerts indicating that replanning is required. The Mission Planning component 50 may use geographic information (e.g., terrain, obstacle, and cultural), environmental information (e.g., weather), situational information (e.g., threat locations and capabilities), and vehicle/team and external asset capability information (e.g., payload availability and mobility models). The Mission Planning component 50 may generate mission plans including travel plans, sensor plans, communication plans, and weapon plans for the teams of vehicles.

At the team level, the Mission Planning component 50 may generate task objectives and constraints for lower level mission planning. The Mission Planning component 50 may then accept, combine, and deconflict these lower level plans when lower level mission planning responds. The Mission Planning component 50 may also accept alerts for changes that require a replan at the team level.

The Contingency Management component 40 may monitor unexpected influences that affect team plan success, such as payload failure, modified orders, new operational constraints, changing environmental conditions and other unexpected changes in a battle space. The Contingency Management component 40 may feature a wide-team contingency resolution escalation process whereby contingency management detects a contingency, assesses an impact, and identifies a plan violation. Then, an affected vehicle may locally execute replan which may resolve the problem. If there are tasks that could not be re-planned locally, the Contingency Management component 40 may then collaborate with other team members to reallocate tasks. If there is a reallocation failure, a team replan may be triggered. If a team replan can not resolve a situation, the Contingency Management component 40 may alert a controlling element (typically a manned asset) to the team planning failure and await new instructions.

The Contingency Management component 40 may implement contingency monitoring and plan impact analysis for most contingency types including air vehicle flight capability degradation, pop-up threats and targets of opportunity, friendly and neutral movements within a battle space, loss of team members, and mission equipment failures. The Contingency Management component 40 may also determine when an emergency mission abort is required and provide a controlling element with control over the level/type of contingency monitoring performed.

The Contingency Management component 40 may receive mission plans and information regarding a changing situation (e.g., new objectives, new constraints, new obstacles, new threats, new targets, changes in vehicle/team capabilities, etc.). The Contingency Management component 40 may issue alerts when plans no longer satisfy objectives and constraints. At the team level, the Contingency Management component 40 may receive alerts of changes that cannot be processed at a lower level and may issue alerts to the Mission Planning component 50 for replanning.

The Collaboration component 30 may assign roles for team member responsibilities, coordinate task execution, and intelligently disseminate information to other team members and external assets. The Collaboration component 30 may assume responsibility for performing team formation behaviors, such as identification and authentication of controlling elements.

The Collaboration component 30 may also enable the autonomous system 10 to dynamically re-team to assume new missions, reallocate tasks in response to new situations and/or failures, and handoff control required for changing a controlling element. In addition, the Collaboration component 30 may determine required interactions with the controlling element and exchanges of information with other autonomous systems within the team and with external assets. The Collaboration component 30 may also coordinate execution of planned tasks.

The Collaboration component 30 may accept messages and route the messages to appropriate recipients. The Collaboration component 30 may process a message if the Collaboration component 30 is the designated recipient (e.g., authentication, team membership, teammate synchronization protocol messages, etc.).

Likewise, the Collaboration component 30 may accept messages for transmission to teammates or external assets, assign the transmission parameters (e.g., addressee, time sensitivity, acknowledgement required, etc.), and pass the messages to communication systems for transmission. The Collaboration component 30 may also generate messages for collaborative functions (e.g., authentication, team membership, teammate synchronization protocol messages, etc.).

The Communication component 70 may provide data links to connect team members with each other and with external assets (e.g., ISR and Networked fires, etc.) across battlefield networks. Software of the Communication component 70 may manage the system 10 by implementing a communication plan provided by the Mission Planning component 50 using available system data links, predicting and monitoring communication Quality of Service (QoS), and optimizing performance of the data links. The Communication component 70 may also request the Mission Planning component 50 to modify plans to keep QoS at effective levels.

The Situation Awareness component 60 may gather data on an external tactical and environmental situation and process the data into a form useful to the other components of the system 10. Just as good situation awareness is critical for a pilot or crewmember to perform effectively in a manned system, the intelligent autonomous system 10 may require complete, timely, specific, and relevant information to make good "decisions".

The Situation Awareness component 60 may perform multi-vehicle track-level data fusion and de-confliction of reports from onboard sensors, teammate autonomous systems, and external sources thereby providing an estimate/prediction of a Common Relevant Operating Picture (CROP). The Situation Awareness component 60 may also prioritize threats, predict future threat location from initial reported position, and generate cues to teammate systems in support of mission information needs.

The Automatic Target Recognition component 90 may perform signal processing for single-sensor detection, tracking, recognition, and identification and may receive sensor data. The Automatic Target Recognition component 90 may also perform multi-sensor feature-level fusion for improved target detection and identification while reducing false alarm rates. The Automatic Target Recognition component 90 may process sensor data for closed-loop target tracking and may provide video and image clips for off-board transmission. The Automatic Target Recognition component 90 may also process video and image clips provided by Automatic Target Recognition components on other unmanned vehicles for improved recognition via analysis of multiple perspectives of the same object.

The Payload Controller component 80 may manage all sensors and weapons, or effectors, including the cross-cueing of onboard sensors. The Payload Controller component 80 may support execution of the commanded sensor plan from the Mission Planning component 50 by arbitrating commands, searching coverage, cueing, scanning and pointing of targeting sensors in both platform-relative and geo-located coordinates. The Payload Controller component 80 may also coordinate with Payload Controller components on other vehicles to provide the Automatic Target Recognition component 90 more information for improved recognition. The Payload Controller component 80 may also process target reports from the Automatic Target Recognition component 90 for region-of-interest (ROI) selection of sensor cueing.

The Air Vehicle Management component 20 may perform several key functions for autonomous terrain flight. The Air Vehicle Management component 20 may refine route plans to minimize overall exposure to threats, factoring in terrain masking, collision risks, and vehicle dynamics.

The Air Vehicle Management component 20 may provide reflexive obstacle and threat response capability to enhance overall system survivability by quickly maneuvering a vehicle out of "harm's way" while a more deliberative autonomous system may generate a replan to achieve mission objectives. The Air Vehicle Management component 20 may generate trajectory commands based on a library of maneuver primitives, such as agile maneuvers that fully span the available flight envelope thereby providing enhanced maneuvering effectiveness for a survivable threat response. The Air Vehicle Management component 20 may accept travel plans (e.g., flight plans, etc.), threat warnings from onboard sensors, and obstacle warnings from obstacle sensors for generating maneuvers to vehicle actuator systems.

The Resource Meta-Control component 100 may provide a software infrastructure for processing and memory resources accessible to other components. The Resource Meta-Control component 100 may operate in concert with lower level resource management functions.

The Resource Meta-Control component 100 may perform system management functions, such a processor switchover, memory zeroize, pre-mission and post-mission data exchange, and fault isolation. The Resource Meta-Control component 100 may manage computational resources by performing resource utilization monitoring, resource allocation for agents, resource reclamation and reallocation, resource tracking, and resource scheduling and optimization. The Resource Meta-Control component 100 may manage agents through agent creation and destruction, agent registration and monitoring, job assignment, status reporting, and agent suspension and resumption. The Resource Meta-Control component 100 may provide other components with access to data by managing publication/subscription interchanges, managing data retention, and performing structured queries upon request.

The components 20, 30, 40, 50, 60, 70, 80, 90, 100 of the system 10 work in concert to effect autonomous and collaborative behaviors. FIGS. 2-10 are example operational threads through these components 20, 30, 40, 50, 60, 70, 80, 90, 100. The Resource Meta-Control component 100 is not shown for clarity. The Resource Meta-Control component 100 interconnects the other components in FIGS. 2-10. FIGS. 1-10 include communication systems/interface 1, sensor systems/interface 2, weapon systems/interface 3, and vehicle control systems/interface 4. These are not components of the system 10, but are example main adjacent systems with which the system 10 may interact.

Figure 2:
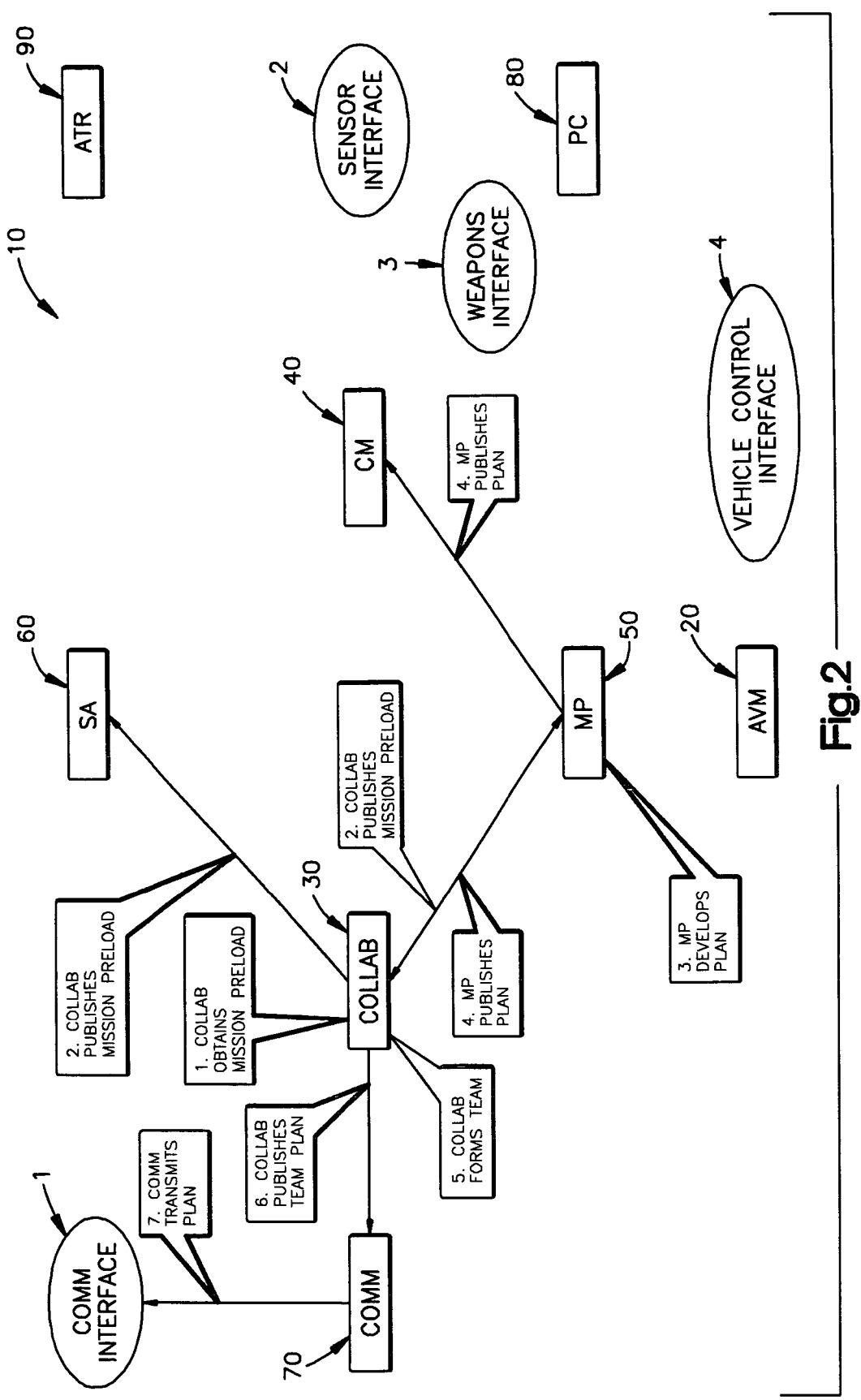
FIG. 2 is an example representation of operation of the system of FIG. 1.

As stated above and shown in FIG. 2, an example mission may be expressed as a set of objectives and constraints. These objectives and constraints may be given to the example system 10 before a mission and before a mission plan is developed. The mission plan may then be sent to a controlling element for approval.

Figure 3:
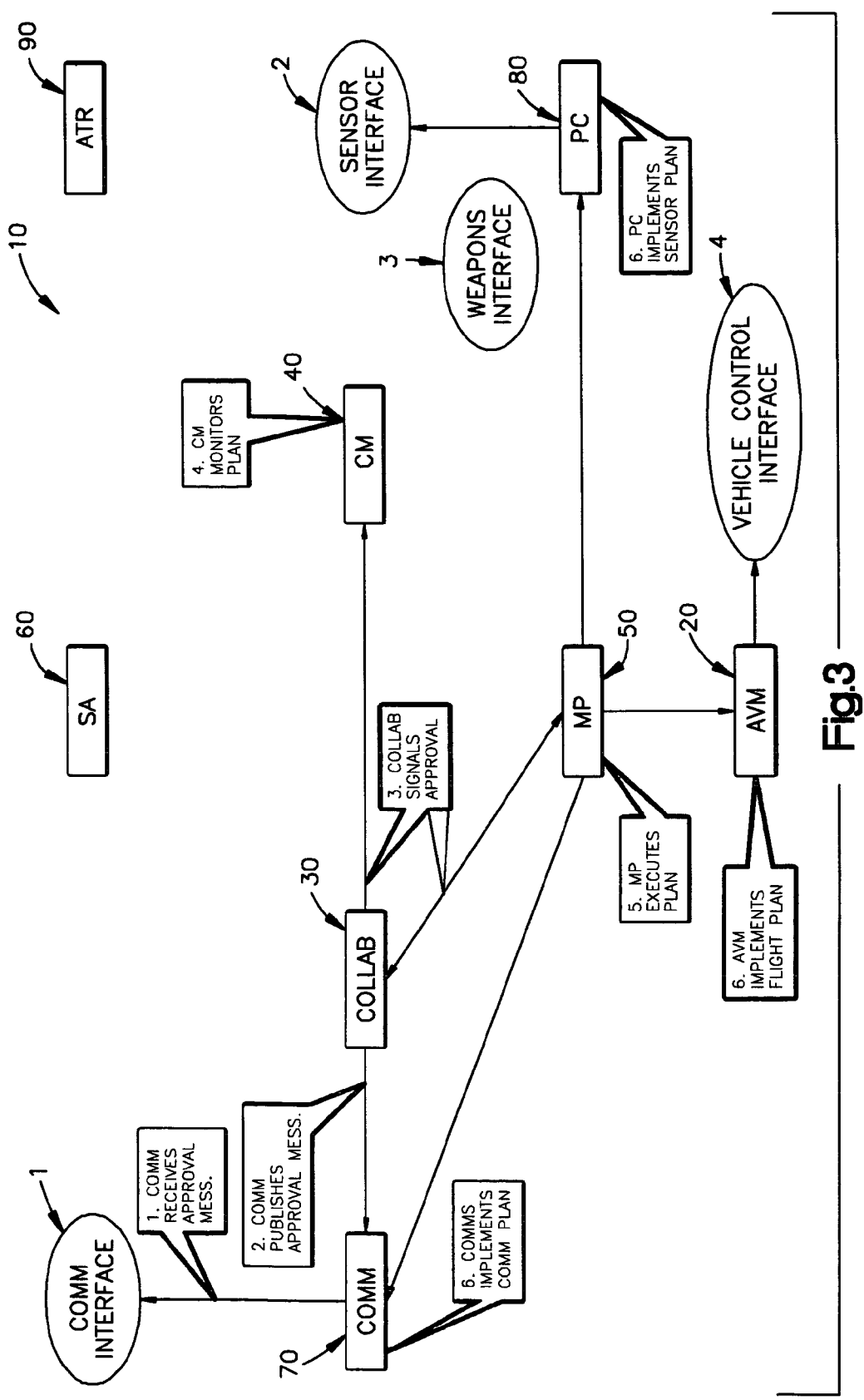
FIG. 3 is another example representation of operation of the system of FIG. 1.

As shown in FIG. 3, typically, it may not be necessary for the controlling element to review and approve the mission plan, but this review/approval will likely occur. Approval may be received via the Collaboration component 30 and the Collaboration component may begin monitoring plan execution. The Mission Planning component 50 may begin to execute the mission plan, send flight plans to the Air Vehicle Management component 20, communication plans to the Communication component 70, and sensor plans to the Payload Controller component 80 thereby implementing the mission plan.

Figure 4:
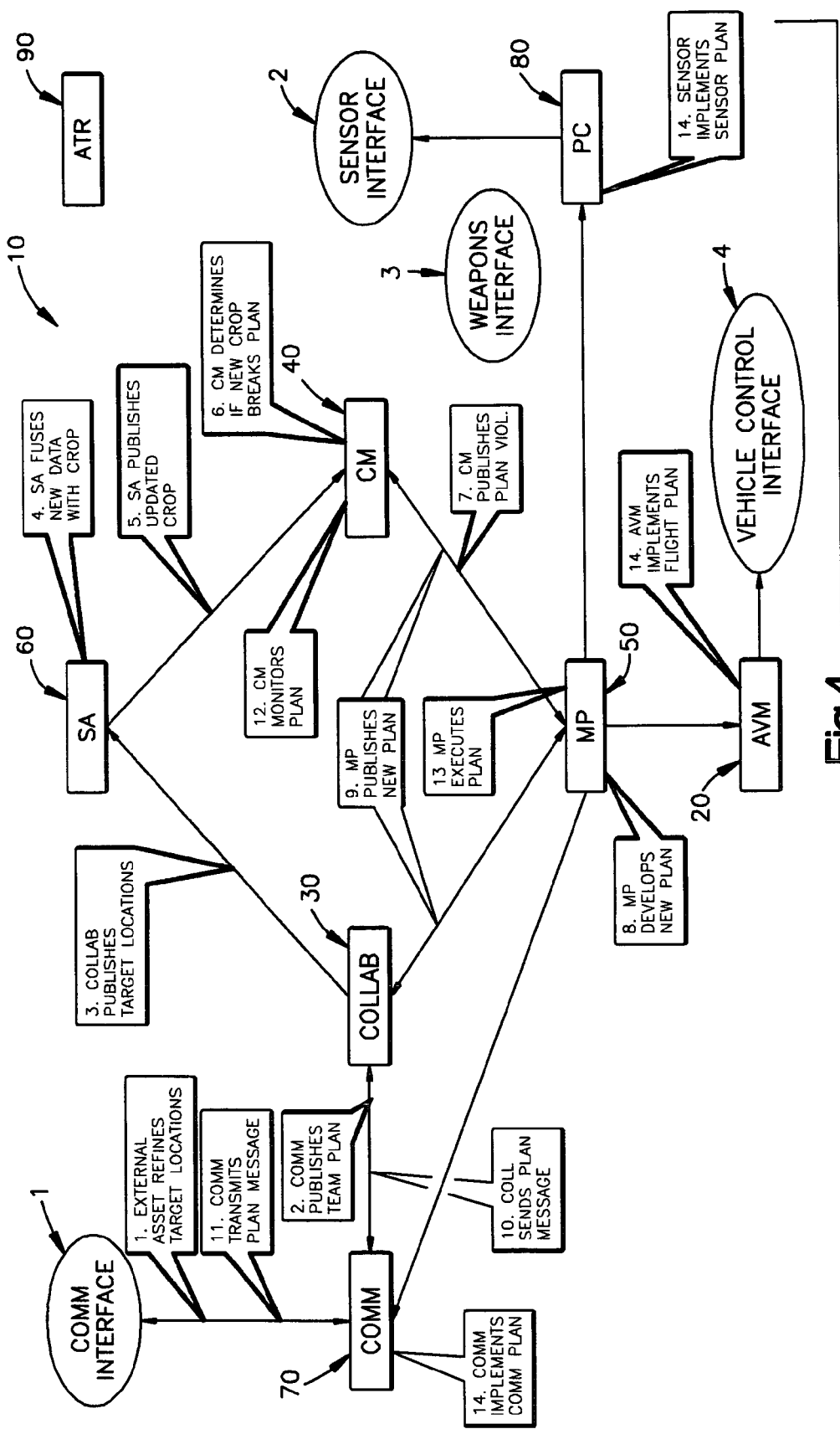
FIG. 4 is still another example representation of operation of the system of FIG. 1.

As shown in FIG. 4, because a situation may be constantly changing, a replan may be necessary. Various causes may necessitate a replan. An external asset may cause a replan. An External Intelligence, Surveillance, and Reconnaissance (ISR) asset may refine target locations in the CROP via the Communication component 70 and the Collaboration component 30. The Situation Awareness component 60 may incorporate new information into the CROP. The Contingency Management component 40 may examine the CROP thereby recognizing that a current plan may not achieve the mission and may alert the Mission Planning component 50. The Mission Planning component 50 may then perform a replan and inform a controlling element via the Collaboration component 30 and the Communication component 70. Approval from a controlling element may not be required so the Mission Planning component 50 may begin executing a new plan, which may be monitored by the Contingency Management component 30 and implemented by the Air Vehicle Management component 20, the Payload Controller component 80, and the Communication component 70.

Figure 5:
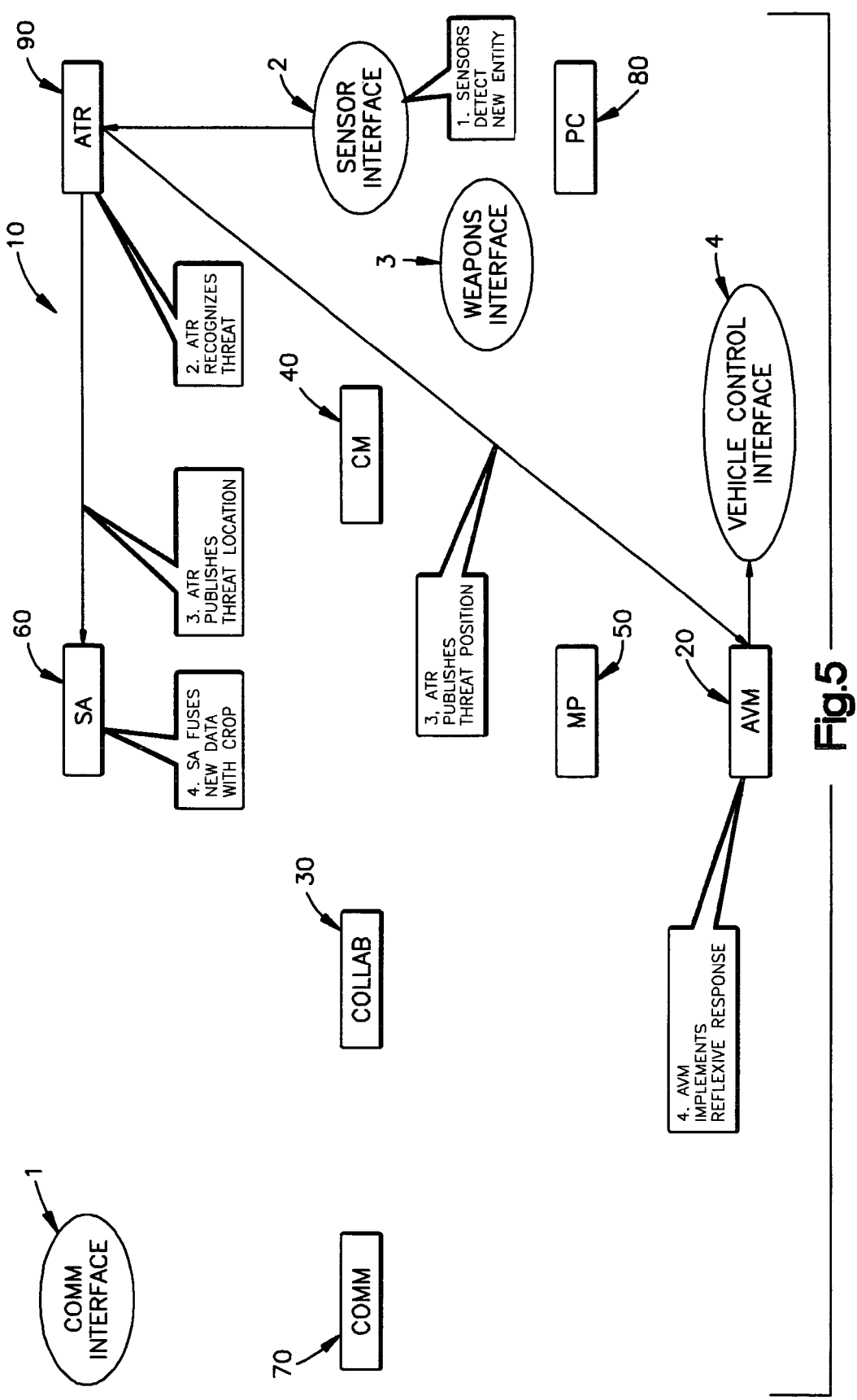
FIG. 5 is yet another example representation of operation of the system of FIG. 1.
Figure 6:
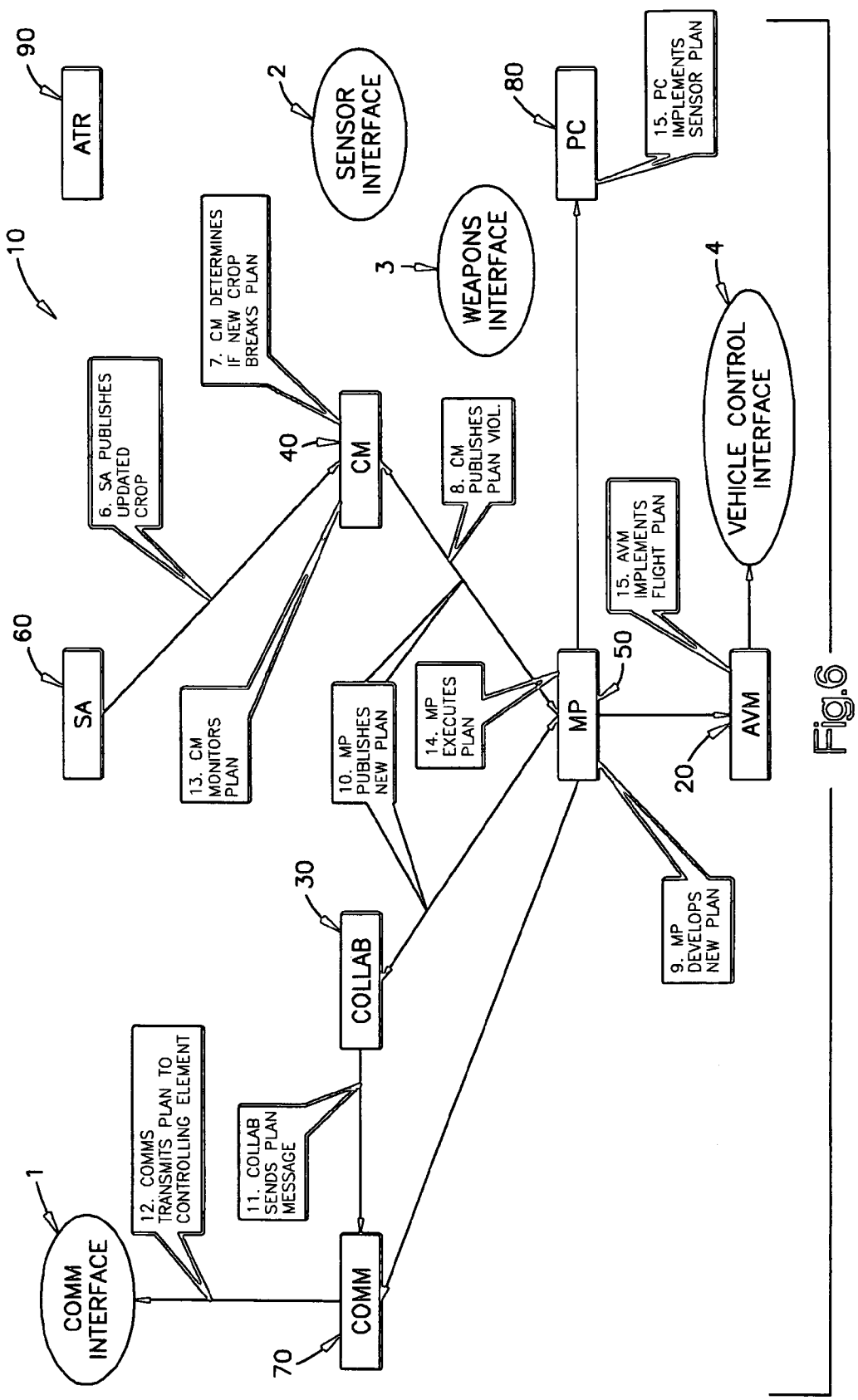
FIG. 6 is still another example representation of operation of the system of FIG. 1.

In FIG. 4, new information from an external source caused a replan. In FIGS. 5 and 6, the autonomous system 10 itself recognizes a change. Sensors may detect a new entity. The Automatic Target Recognition component 90 may recognize the entity as a threat. The Automatic Target Recognition component 90 alerts the Air vehicle Management component 20, which generates a short-term response. The Automatic Target Recognition component 90 also alerts the Situation Awareness component 60, which incorporates new information into the CROP. The thread of FIGS. 5 and 6 is thus similar to FIG. 4. However, an optimal course of action may be to engage the threat, so the Mission Planning component 50 may generate an engagement plan. In this example, the rules of engagement may demand that a controlling element provide weapons release authority. Thus, this authority is requested via the Collaboration component 30 and the Communication component 70.

Figure 7:
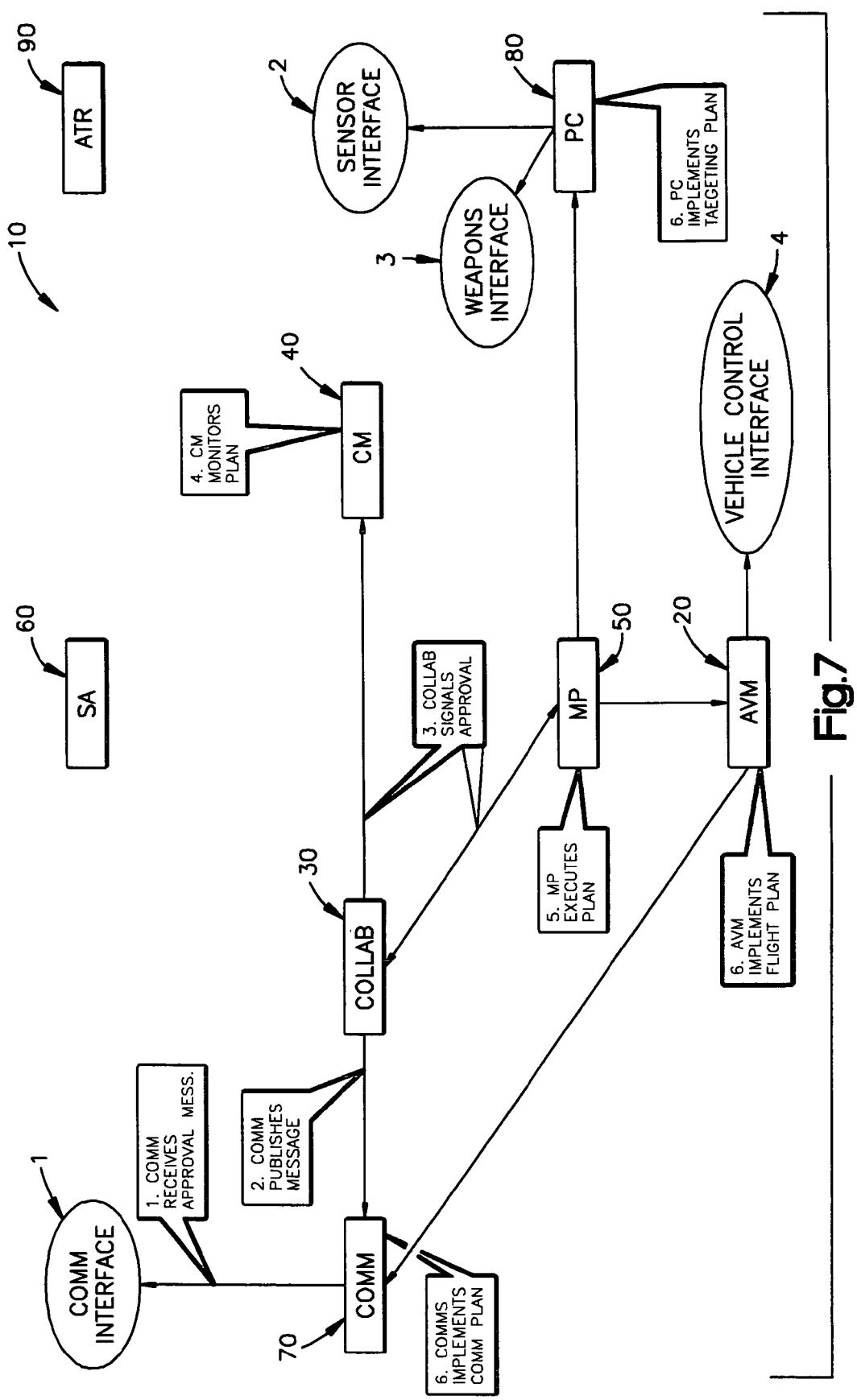
FIG. 7 is yet another example representation of operation of the system of FIG. 1.

FIG. 7 continues the example of FIGS. 5 and 6. Permission to engage is received via the Communication component 70 and the Collaboration component 30. The Mission Planning component 50 executes the engagement plan and the Payload Controller component 80 and Air Vehicle Management component 20 implement the engagement plan resulting in weapons release.

Beyond the above-described autonomous functionality lies collaborative functionality. The following examples illustrate the collaborative aspects of various components of the system 10 through the instantiation of the system on all team members.

Figure 8:
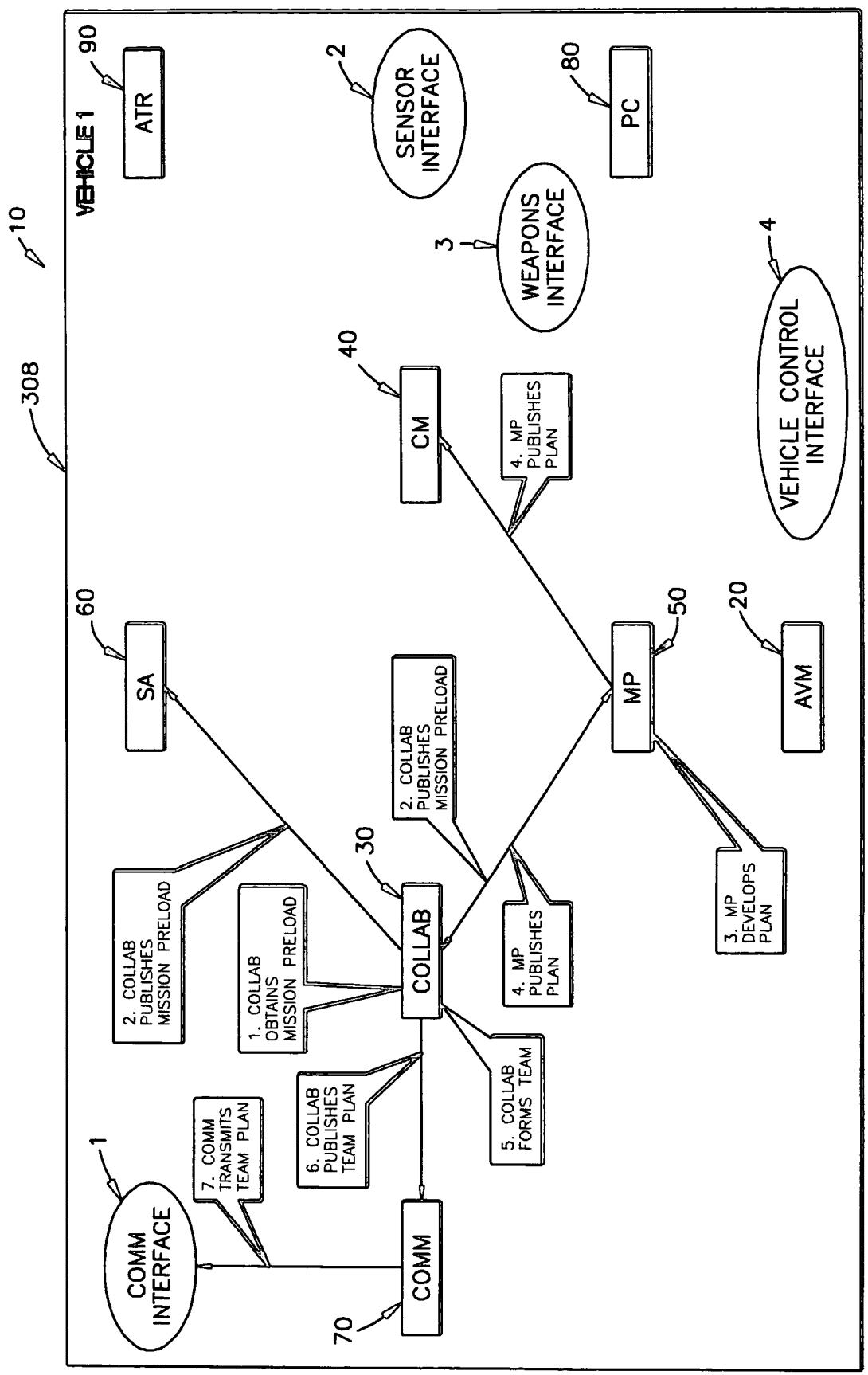
FIG. 8 is still another example representation of operation of the system of FIG. 1.

Unlike FIG. 7, the example of FIG. 8 shows a mission being issued to a team. Thus, a collaborative hierarchy comes into play. As above, the mission objectives and constraints are received by vehicle one 308. One of the constraints may be a list of assets available to carry out the mission. The Mission Planning component 50 decomposes the mission into tasks for various assets along with requirements of each asset. Meanwhile, the Collaboration component 30 has discovered and authenticated the assets. The Collaboration component 30 assigns tasks to assets based on the received requirements, associates the tasks with the team, and issues the tasks to the team members.

It may be desirable to perform all pre-mission planning on a single vehicle (i.e., vehicle one 308). In this case, additional instances of mission planning would be instantiated in order to generate the task plans. However, in general, offload of processing to teammates is possible. Indeed, for replanning with imperfect communication, it may be desirable for individual vehicles to receive small task descriptions and perform their own processing rather than a receiving a detailed task plan.

Figure 9:
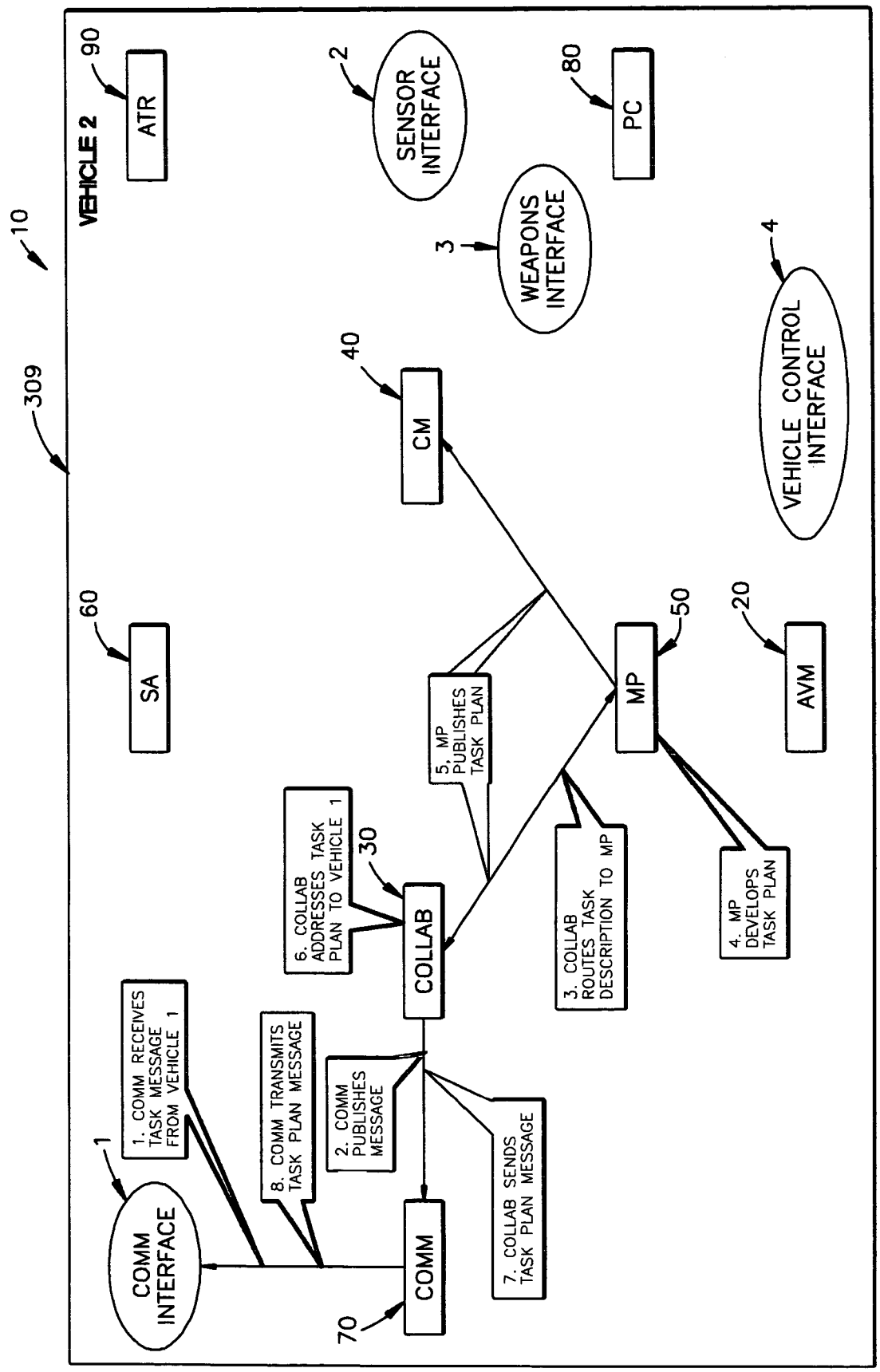
FIG. 9 is yet another example representation of operation of the system of FIG. 1.

Assuming that multiple vehicles are performing the planning, other vehicles in a team receive a task. FIG. 9 shows an example process for vehicle two 309. The task is received and routed to the Mission Planning component 50. The Mission Planning component 50 then treats the task as a single vehicle mission for vehicle two 309 and the thread continues as in FIG. 2.

Note that this process could take place on vehicles one through N. The system 10 is scalable, easily multiplied to whatever a mission requires.

Figure 10:
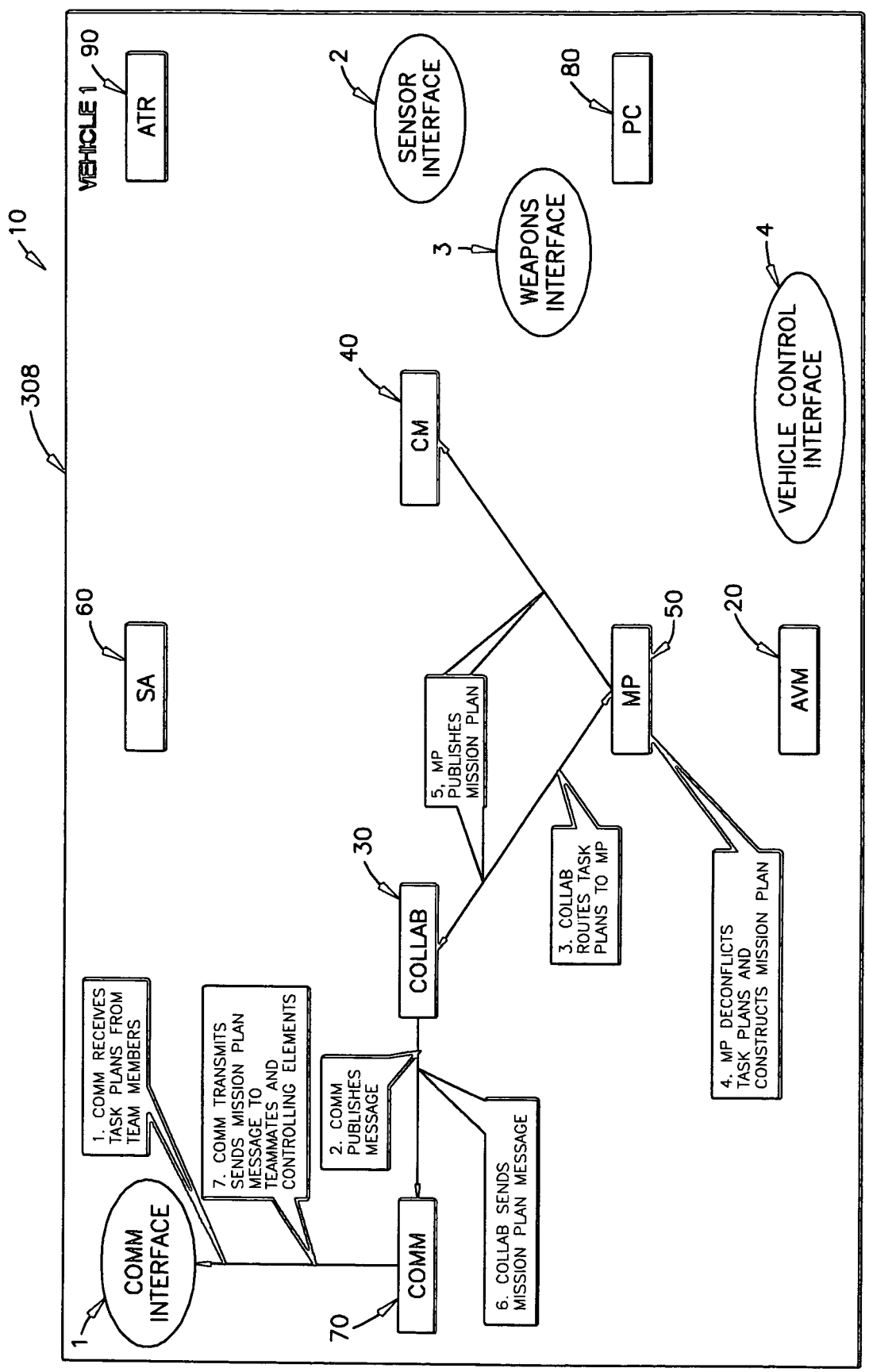
FIG. 10 is still another example representation of operation of the system of FIG. 1.

As shown in FIG. 10, vehicle one 308 then receives and deconflicts the task plans and issues a full mission plan to all team members including a controlling element. Teammates receive the full mission plan so that teammates are aware of teammate actions when replanning is necessary. Assuming the controlling element approves the mission plan, all team members begin executing the mission plan, as shown in FIG. 3.

Similarly, a reaction to a change may also be collaborative. Because each team member may be aware of the team mission plan, each team member may be capable of determining when a change the team member detects affects teammates. For example, consider a pop-up threat response, as in FIGS. 5 and 6. Because a pop-up threat would likely be processed in due course due to a team CROP update similar to that shown in FIG. 4, consider the discovery of a previously unknown obstacle. The process is similar to that shown in FIGS. 5 and 6.

This obstacle may affect a teammate whose task plan will cause the teammate to encounter the obstacle at a later time. The detecting teammate may recognize this situation and alert the Mission Planning component 50 that a team replan is required.

A loss of capability of a team member may be processed in a similar fashion. For example, if vehicle one 308 recognizes a sensor failure and a teammate must perform coverage of the lost sensor in order to achieve the objectives of the mission, vehicle one 308 may recognize that the team is affected and trigger a team replan.

The architecture of the system in accordance with the present invention offers substantial advantages over conventional approaches. Unlike conventional approaches, the system recognizes a need to partition components thereby requiring distinct disciplines for analysis, development, and operation, as well as the need for autonomy, to be collaborative both with other autonomous systems of a team and systems external to a team. This offers utility more extensible and scalable than conventional approaches.

Because the components of the system are decoupled, analysis and development may be performed by different disciplines with relative independence. In addition, new or upgraded algorithms may be added to the system with a minimum of disturbance of existing components.

Collaboration is an integral part of the system architecture—an entire component is dedicated to collaboration and many components have collaborative concepts at their core. For example, the Mission Planning component is hierarchical in nature so that teams may be formed and reformed with tasks allocated and reallocated to team members. The Contingency Management component is hierarchical in nature, supporting the concept of issues being addressed at a team level. These issues are typically not addressed, or addressed as an afterthought, in conventional approaches.

Because collaboration has been incorporated at the core of key components, the architecture of the system is scalable. The architecture may function with multiple instances of itself so that vehicles of a team may function synergistically. Because the robust system architecture may function with a variable number of instances and the instances are autonomous, intermittent communication between instances, or complete loss of an instance, may be processed "gracefully".

In particular, this adaptation of the system may provide more vehicle specific components—a Communication component, a Payload Controller component, and an Automatic Target Recognition component. These components require additional disciplines and are more implementation specific than core collaborative autonomy and functionality. However, the vehicle specific components may also exhibit collaborative aspects.

Figure 11:
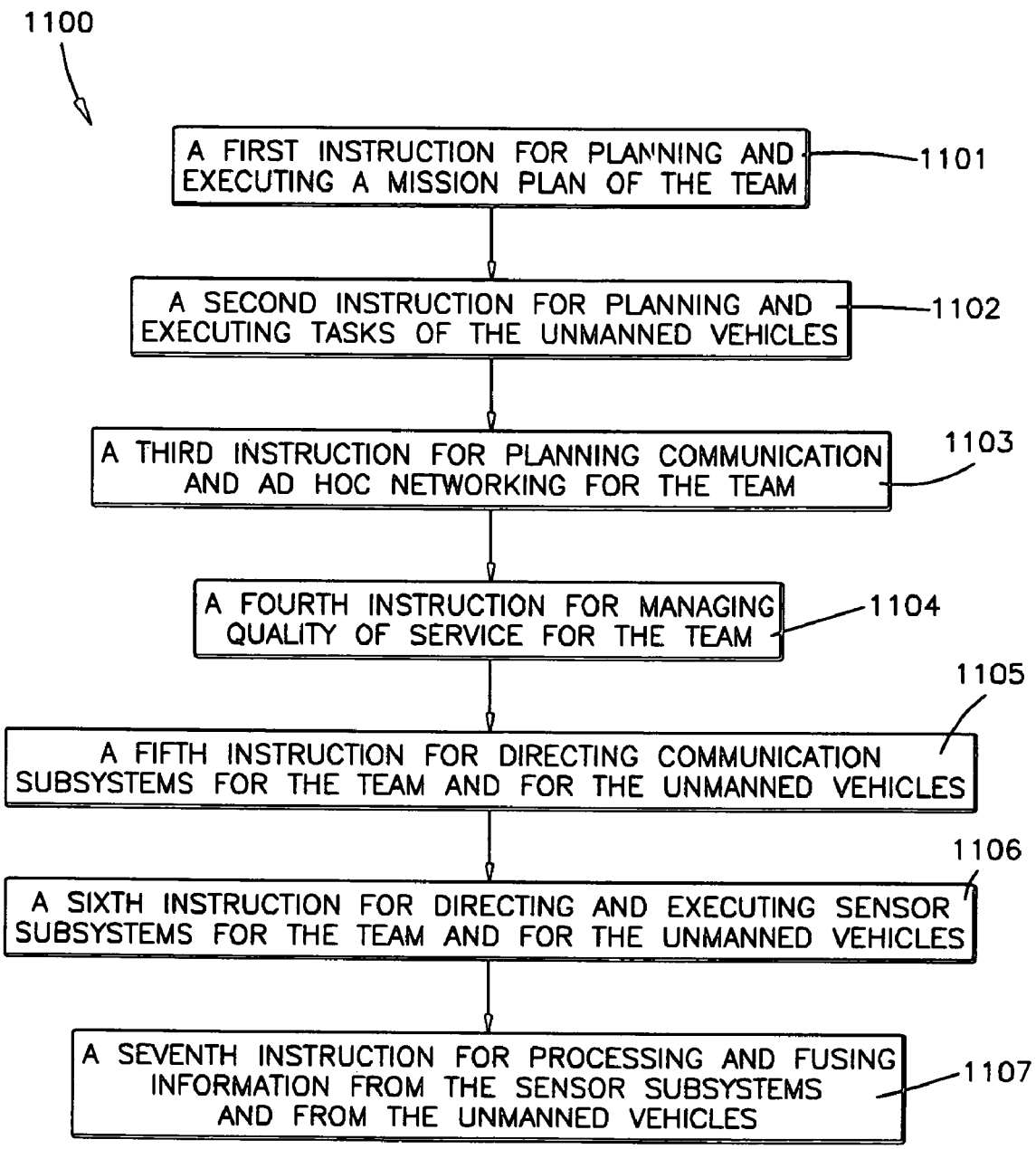
FIG. 11 is an example schematic representation of a computer program product in accordance with the present invention.

As shown in FIG. 11, an example computer program product 1100 in accordance with the present invention collaboratively and autonomously plans and controls a team of unmanned vehicles having subsystems within an environment. The computer program product 1100 includes: a first instruction 1101 for planning and executing a mission plan of the team; a second instruction 1102 for planning and executing tasks of the unmanned vehicles; a third instruction 1103 for planning communication and ad hoc networking for the team; a fourth instruction 1104 for managing quality of service for the team; a fifth instruction 1105 for directing communication subsystems for the team and for the unmanned vehicles; a sixth instruction 1106 for directing and executing sensor subsystems for the team and for the unmanned vehicles; and a seventh instruction 1107 for processing and fusing information from the sensor subsystems and from the unmanned vehicles.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-programmable held computing devices, microprocessor-based or consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for collaboratively and autonomously planning and controlling a team of vehicles having subsystems within an environment, said system comprising:

a first mission planning component, located at a first vehicle of the team of vehicles, configured to receive a set of mission objectives and constraints associated with a given mission, determine a plurality of tasks for at least the first vehicle and a second vehicle of the team of vehicles, and plan and execute a mission plan for the vehicle based upon at least one task for the first vehicle;

a collaboration component, located at the first vehicle, configured to assign at least one of the plurality of tasks to the second vehicle;

a communication component, located at the first vehicle, configured to provide communication and networking between the first vehicle and the team of vehicles, said communication component managing quality of service for the team, said communication component directing communication subsystems for the team and for the vehicles;

a payload controller component, located at the first vehicle, configured to direct and execute sensor subsystems for the first vehicle;

an automatic target recognition component, located at the first vehicle, configured to process and fuse information from the sensor subsystems and from the vehicles for use by said mission management component; and a second mission planning component, located at the second vehicle, configured to receive at least one task from the first collaboration component, develop instructions for each of a plurality of other components located at the second vehicle, and direct each of the plurality of other components at the second vehicle to execute the determined instructions to perform the at least one task.

2. The system as set forth in claim 1 wherein said payload controller component collaboratively manages sensors and effectors of the vehicles.

3. The system as set forth in claim 1 wherein said automatic target recognition component tracks potential objects.

4. The system as set forth in claim 1 further including a contingency management component for collaboratively monitoring unexpected influences that affect success of the team mission plan.

5. The system as set forth in claim 1 further including a situational awareness component for performing collaborative fusion of data from the vehicle team.

6. The system as set forth in claim 1 further including a resource meta-control component for providing processing and memory resources for the vehicles.

7. The system as set forth in claim 1 wherein said first mission planning component is located onboard a vehicle.

8. The system as set forth in claim 1 wherein said first mission planning component develops a collaborative synchronized plan for the team of subsystems, said collaborative synchronized plan governing sensor deployment, flight paths, communication, and engagements of the vehicles.

9. The system as set forth in claim 8 wherein said collaborative synchronized plan further governs information dissemination to the vehicles.

10. The system as set forth in claim 1 further including a contingency management component for detecting a contingency, assessing an impact of the contingency, and identifying the contingency as a team mission plan violation.

* * * * *

UNITED STATES PATENT AND TRADEMARK OFFICE
CERTIFICATE OF CORRECTION

| | |
|---|---|
| PATENT NO. | : 7,734,386 B2 |
| APPLICATION NO. | : 11/188685 |
| DATED | : June 8, 2010 |
| INVENTOR(S) | : Dale E. DelNero et al. |

Page 1 of 1

It is certified that error appears in the above-identified patent and that said Letters Patent is hereby corrected as shown below:

Col. 1, line 4, before "FIELD OF INVENTION", add:

--GOVERNMENT FUNDING

This invention was made with government support under Agreement Number MDA972-02-9-0011 awarded by DARPA. The Government has certain rights in the invention.--

Signed and Sealed this

Thirty-first Day of August, 2010

David J. Kappos
*Director of the United States Patent and Trademark Office*